(12) United States Patent
Schreck et al.

(10) Patent No.: US 9,922,676 B1
(45) Date of Patent: Mar. 20, 2018

(54) DATA STORAGE DEVICE GRADUALLY DECREASING LASER POWER AFTER WRITE OPERATION

(71) Applicant: Western Digital Technologies, Inc., San Jose, CA (US)

(72) Inventors: Erhard Schreck, San Jose, CA (US); Oscar J. Ruiz, San Jose, CA (US); Na Wang, San Jose, CA (US); Shaomin Xiong, San Jose, CA (US); Qing Dai, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/616,569

(22) Filed: Jun. 7, 2017

(51) Int. Cl.
  *G11B 7/00* (2006.01)
  *G11B 7/1263* (2012.01)

(52) U.S. Cl.
  CPC .................................. *G11B 7/1263* (2013.01)

(58) Field of Classification Search
  CPC ..... G11B 7/0062; G11B 7/00456; G11B 7/26; G11B 7/131; G11B 7/13; G11B 2007/0006
  USPC ........... 369/59.11, 59.12, 116, 120, 121, 122
  See application file for complete search history.

(56) References Cited

U.S. PATENT DOCUMENTS

| | | | |
|---|---|---|---|
| 6,381,206 B1 * | 4/2002 | Maeda | G11B 7/0956 369/53.19 |
| 8,787,125 B1 | 7/2014 | Lee | |
| 9,620,162 B1 | 4/2017 | Haralson | |

* cited by examiner

*Primary Examiner* — Nabil Hindi (57) ABSTRACT

A data storage device is disclosed comprising a head actuated over a disk, wherein the head comprises a laser configured to heat the disk while writing data to the disk. A write power is applied to the laser in order to write data to the disk during a write operation. A determination is made as to whether the laser power should be in an off state after the write operation. After the write operation, the laser power is gradually decreased to the off state based on a first decrease function.

39 Claims, 5 Drawing Sheets

DATA STORAGE DEVICE GRADUALLY DECREASING LASER POWER AFTER WRITE OPERATION

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
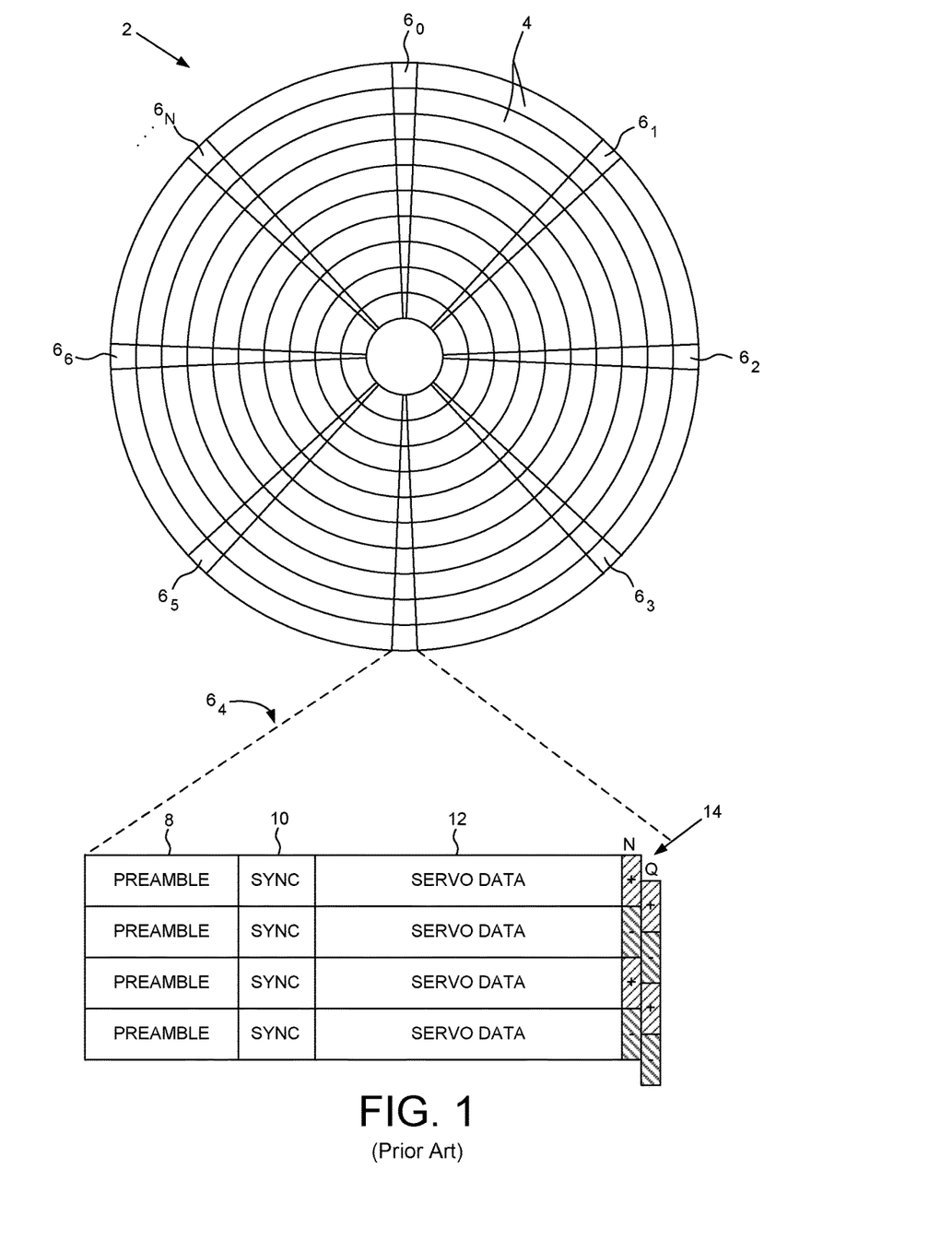
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
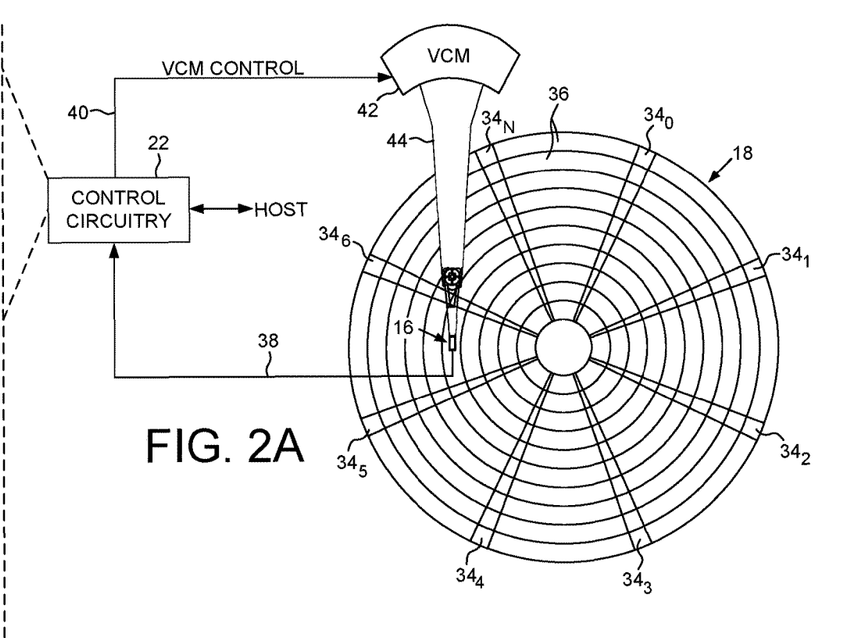
FIGS. 2A and 2B show a data storage device in the form of a disk drive comprising a head actuated over a disk, wherein the head comprises a laser configured to heat the disk while writing data to the disk.
Figure 2B:
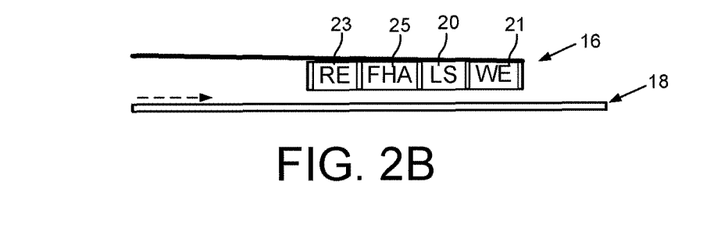
Figure 2C:
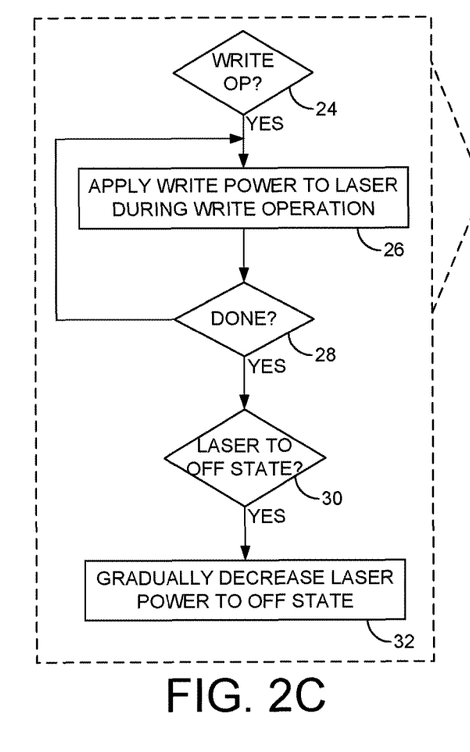
FIG. 2C is a flow diagram according to an embodiment wherein after a write operation the laser power is gradually decreased to an off state.

FIGS. 2A and 2B show a data storage device in the form of a disk drive according to an embodiment comprising a head 16 actuated over the disk 18, wherein the head comprises a laser 20 (FIG. 2B) configured to heat the disk while writing data to the disk. The disk drive further comprises control circuitry 22 configured to execute the flow diagram of FIG. 2C, wherein when a write operation is executed (block 24) a laser power applied to the laser is configured with a write power in order to write data to the disk during a write operation (block 26). When writing to the disk is finished (block 28), and it is determined that the laser power should be in an off state after the write operation (block 30), the laser power is gradually decreased to the off state based on a first decrease function (block 32).

The laser power may be gradually decreased after a write operation for any suitable reason, such as to prevent damage to the head that may result from an abrupt decrease in the laser power. In another embodiment described below, the laser power may be gradually decreased after a write operation in order to spread the distribution of material buildup on the head over the disk (e.g., distribute the material over the servo sectors). The laser power in the off state may be any suitable value, such as any value from a small percentage of the write power (e.g., less than ten percent of the write power) down to zero.

In the embodiment of FIG. 2B, the head 16 comprises a suitable write element 21 (e.g., an inductive coil), a suitable read element 23 (e.g., a magnetoresistive element), and a suitable fly height actuator (FHA) 25 configured to actuate the head 16 vertically over the disk 18. Any suitable FHA 25 may be employed, such as a heater that actuates through thermal expansion, or a piezoelectric actuator that actuates through mechanical deflection. The head 16 may comprise any suitable laser 20 for heating the disk 18, such as a laser diode, as well as any suitable optics for focusing the light emitted by the laser 20 onto the disk, such as a waveguide and a near field transducer (NFT).

In the embodiment of FIG. 2A, the disk 18 comprises a plurality of servo sectors $34_0$-$34_N$ that define a plurality of servo tracks 36, wherein data tracks are defined relative to the servo tracks at the same or different radial density. The control circuitry 22 processes a read signal 38 emanating from the head 16 to demodulate the servo sectors and generate a position error signal (PES) representing an error between the actual position of the head and a target position relative to a target track. A servo control system in the control circuitry 22 filters the PES using a suitable compensation filter to generate a control signal 40 applied to a voice coil motor (VCM) 42 which rotates an actuator arm 44 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

Figure 3A:
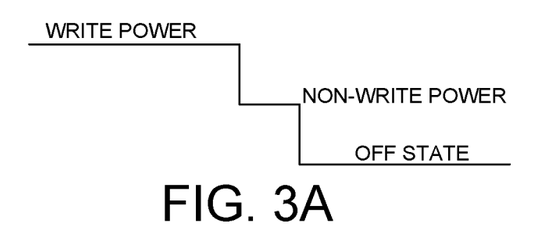
FIG. 3A-3D show different embodiments for gradually decreasing the laser power after a write operation.
Figure 3B:
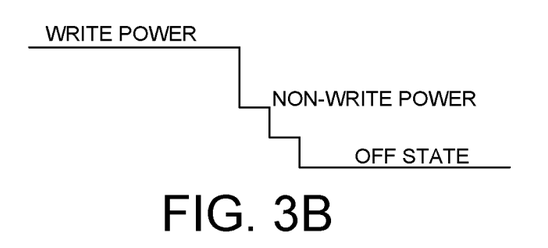
Figure 3C:
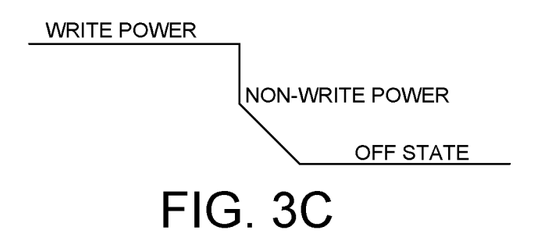
Figure 3D:
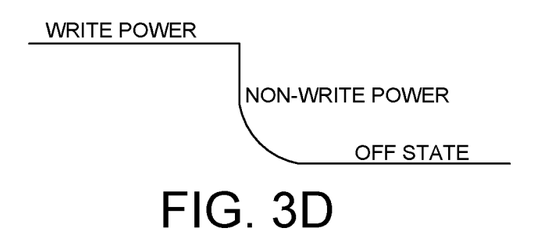

After a write operation, the laser power may be gradually decreased to the off state based on any suitable decrease function. FIG. 3A shows an example decrease function as comprising a first step decrease to a non-write power which is a power low enough to prevent corrupting previously written data on the disk, such as 50% of the write power. After a suitable interval, the decrease function comprises as second step decrease to the off state. FIG. 3B shows an alternative embodiment wherein the decrease function comprises a first step decrease to the non-write power followed by multiple step decreases to the off state. FIG. 3C shows another embodiment wherein the decrease function comprises a step decrease to the non-write power, followed by a ramp down to the off state. FIG. 3D shows yet another embodiment wherein the decrease function comprises a step decrease to the non-write power, followed by an exponential decay to the off state. The decrease function may be implemented in any suitable manner, such as with digital-to-analog conversion (DAC) circuitry driven by a microprocessor or a state machine, and/or analog circuitry (passive and/or active) such as a capacitor for implementing the exponential decay function shown in FIG. 3D.

In one embodiment, a nominal decrease function may be determined by evaluating a subset of disk drives, wherein each production disk drive may be configured with the nominal decrease function during manufacturing. In another embodiment, the decrease function may be calibrated for each production disk drive during a calibration procedure. For example, in one embodiment the non-write power for the laser may vary across disk drives, and so the non-write power may be calibrated for each disk drive in any suitable manner, such as by writing a test data to the disk at the write power, and then reading the test data at different levels of the non-write power to determine the power level that causes an acceptable degradation of the written data.

In one embodiment, the decrease function may be adjusted over the life of the disk drive based on any suitable criteria. For example, in one embodiment the integrity of the head components may be measured over the life of the disk drive and the duration of the decrease function may be increased if component degradation is detected. In other embodiment, the decrease function may be adjusted based on laser degradation over time, such as by increasing the non-write power level applied to the laser in order to maintain a substantially constant output power. In another embodiment, the duration of the decrease function may be reduced over time in order to reduce the laser degradation caused by gradually decreasing the laser power after a write operation (as compared to a step decrease to zero). That is, reducing the duration of the decrease function may increase the life of the laser by reducing the amount of time power is applied to the laser. In one embodiment, performance data on head component degradation as well as laser degradation may be maintained by each disk drive while deployed in the field, wherein the performance data may be evaluated to adjust the decrease function (and optionally an adaption function) for future disk drives.

In one embodiment, material may build up on the head during normal operations, such as particle contaminates, lubricant pickup, etc. If the laser power is abruptly reduced to the off state after a write operation, it has been found that the material buildup may be deposited onto the disk surface. This material buildup may change the fly height of the head when passing over the material, thereby adversely affecting the performance of write/read operations. Accordingly, in one embodiment after a write operation the laser power is gradually reduced to the off state so as to control the deposition of material from the head to the disk surface, for example, by spreading the material buildup over a larger area of the disk surface as opposed to dumping all of the material immediately following the write operation.

In one embodiment, after a write operation the laser power may be gradually reduced by reducing the laser power to a non-write level, and then reducing the laser power further as the head passes over a servo sector so as to deposit the material buildup over the servo sector. In this embodiment, the servo data may be recorded in the servo sectors at a significantly lower density than the data sectors, and so the material buildup over the servo sectors may not significantly impact the ability to read the servo data as compared to user data recorded in the data sectors.

Figure 4A:
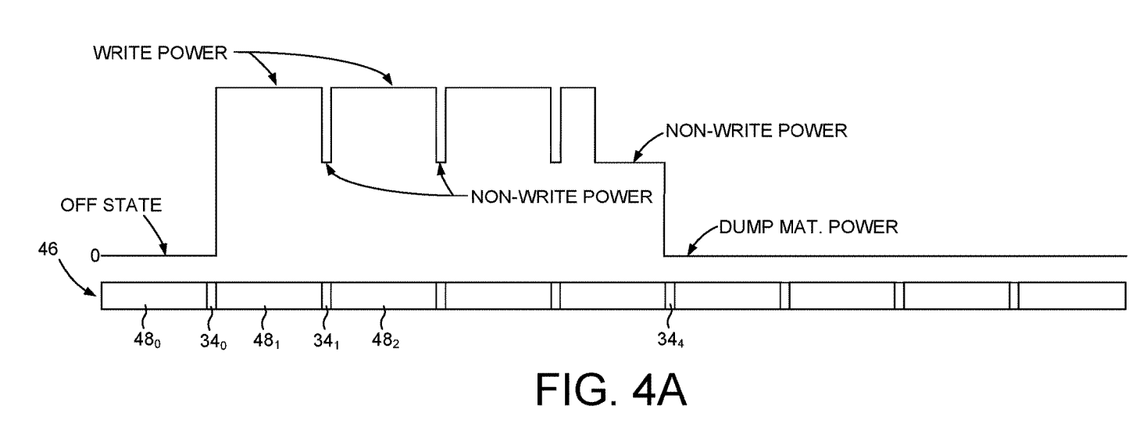
FIG. 4A shows an embodiment wherein after a write operation the laser power is decreased while the head is over a servo sector in order to deposit material buildup on the head over the servo sector.

An example of this embodiment is shown in FIG. 4A, wherein a data track 46 may comprise a plurality of data segments $48_0$-$48_N$ between consecutive servo sectors $34_0$-$34_N$, wherein each data segment $48i$ may comprise a plurality of data sectors. During a write operation, a write power is applied to the laser while writing data to the data sectors, and a non-write power is applied while reading the servo sectors to prevent corrupting the servo sectors. At the end of the write operation, the non-write power is applied to the laser in order to prevent corrupting the following data sectors, but also to prevent (or significantly reduce) material buildup on the head from being deposited on the disk surface. When the head reaches servo sector $34_4$, the laser power is decreased to the off-state in order to deposit the material buildup on the head over the servo sector $34_4$. In the example of FIG. 4A, the laser power is decreased to the off state using a step function; however, in other embodiments the laser power may be decreased to the off state based on any suitable decrease function, such as in the above-described FIGS. 3B-3D. In one embodiment, gradually decreasing the laser power to the off state using multiple steps, a ramp, an exponential decay etc., may help spread the material evenly over the servo sector $34_4$.

Figure 4B:
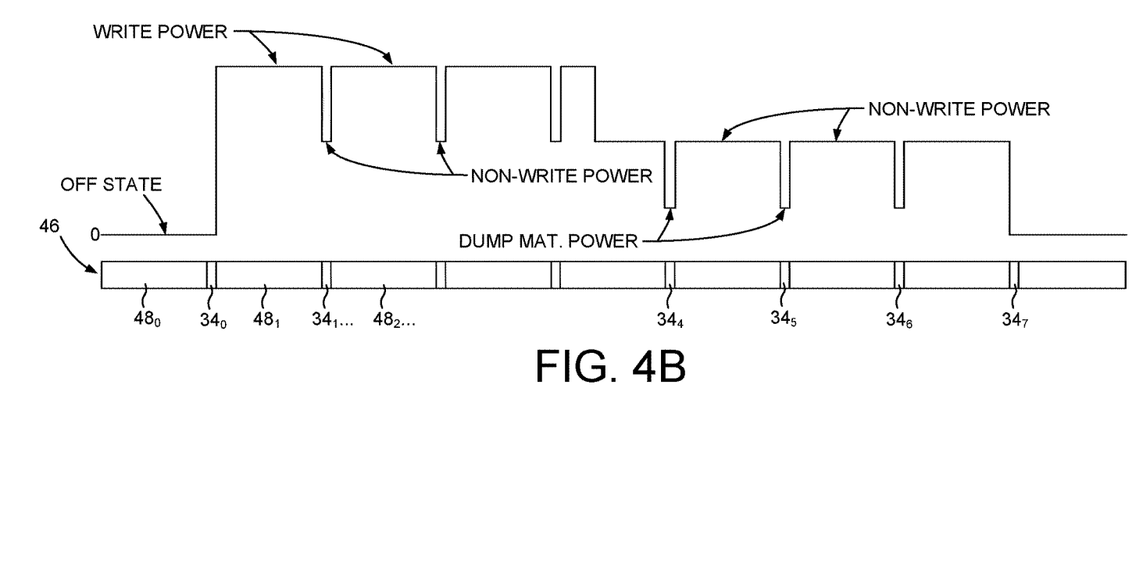
FIG. 4B shows an embodiment wherein after a write operation the laser power is decreased in order to spread the material built up on the head over multiple servo sectors.

FIG. 4B shows an alternative embodiment wherein after the write operation, the laser power may be decreased to the non-write level while the head is over the following data sectors, and reduced to a "dump material power" when the head is over a number of following servo sectors. In this embodiment, the "dump material power" may be selected so as to deposit a fraction of the material built up on the head over multiple servo sectors, thereby spreading the material buildup over the multiple servo sectors as opposed to depositing all of the material buildup over a single servo sector. Similar to the embodiments described above, any suitable decrease function may be employed to reduce the laser power from the non-write power to the "dump material power," such as with multiple steps, a ramp, exponential decay, as shown in FIGS. 3B-3D.

In the embodiment of FIG. 4B, any suitable laser power may be selected for the "dump material power" so as to spread the material buildup over any suitable number of servo sectors. With a higher "dump material power," the material may be spread over more servo sectors with the drawback of reducing the life of the laser due to a longer duration of non-zero laser power applied to the laser after a write operation. Any suitable technique may be employed to calibrate the "dump material power," such as by performing a calibration procedure during manufacturing or while the disk drive is deployed in the field. Additionally, the "dump material power" and/or number of servo sectors affected may be adjusted over the life of the disk drive in order to balance degradation of the laser with write/read performance. In one embodiment, performance data collected from disk drives deployed in the field may be used to optimize the "dump material power" (and optionally an adaption function) for future disk drives.

In one embodiment, the amount of material deposited over each servo sector may be tracked over the life of the disk drive and the laser power controlled so as to distribute the deposition of the material evenly over the servo sectors. Referring to the example of FIG. 4B, if more material has been deposited over servo sector 344 during previous write operations, the laser power may remain at the non-write level while the head passes over servo sector 344 (or the "dump material power" increased) so that more of the material may be deposited over other servo sectors that have a better margin.

Figure 5A:
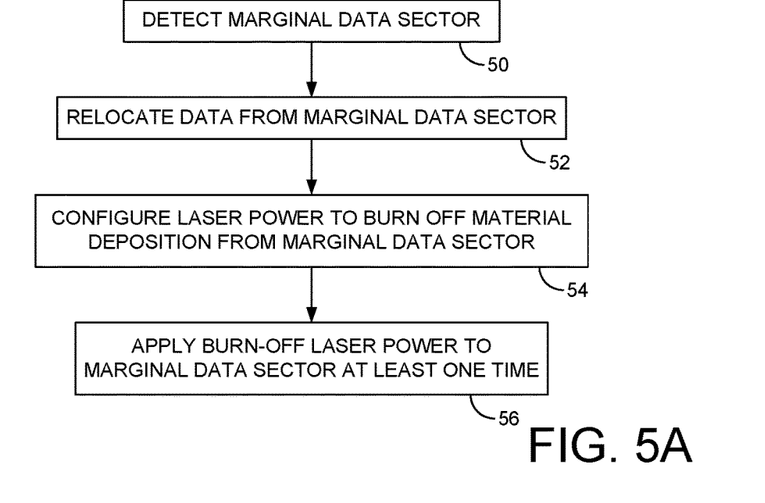
FIG. 5A is a flow diagram wherein when a marginal data sector is detected, a burn-off laser power is applied to the laser in order to burn off material buildup from the marginal data sector.

FIG. 5A is a flow diagram according to an embodiment executed by the control circuitry 22 of FIG. 2A, wherein a marginal data sector may be detected (block 50), for example, by detecting a number of bit errors (or other quality metric) during a read operation. In one embodiment, the degradation of the data sector may be due to material buildup over the data sector, such as material deposited from the head as described above, or other contaminates on the disk surface. In one embodiment, the control circuitry may confirm the degradation is due to material buildup on the data sector by detecting a change in fly height of the head in addition to a degraded quality metric. In yet another embodiment, a change in the fly height alone may indicate a marginal data sector due to material buildup on the data sector.

When a marginal data sector is detected and there is data previously written to the data sector, the data is relocated from the marginal data sector to a non-volatile memory (block 52), such as a reserved area on the disk or in a non-volatile semiconductor memory. The laser power is then configured to a "burn-off power" in order to burn off the material buildup covering the marginal data sector (block 54). Any suitable "burn-off power" may be applied, such as a power that is less than the write power, equal to the write power, or greater than the write power. The "burn-off power" is applied to the laser while the head is over the marginal data sector at least one time (block 56), and in one embodiment, the "burn-off power" may be applied so as to "burn" the marginal data sector multiple times over multiple disk revolutions.

Figure 5B:
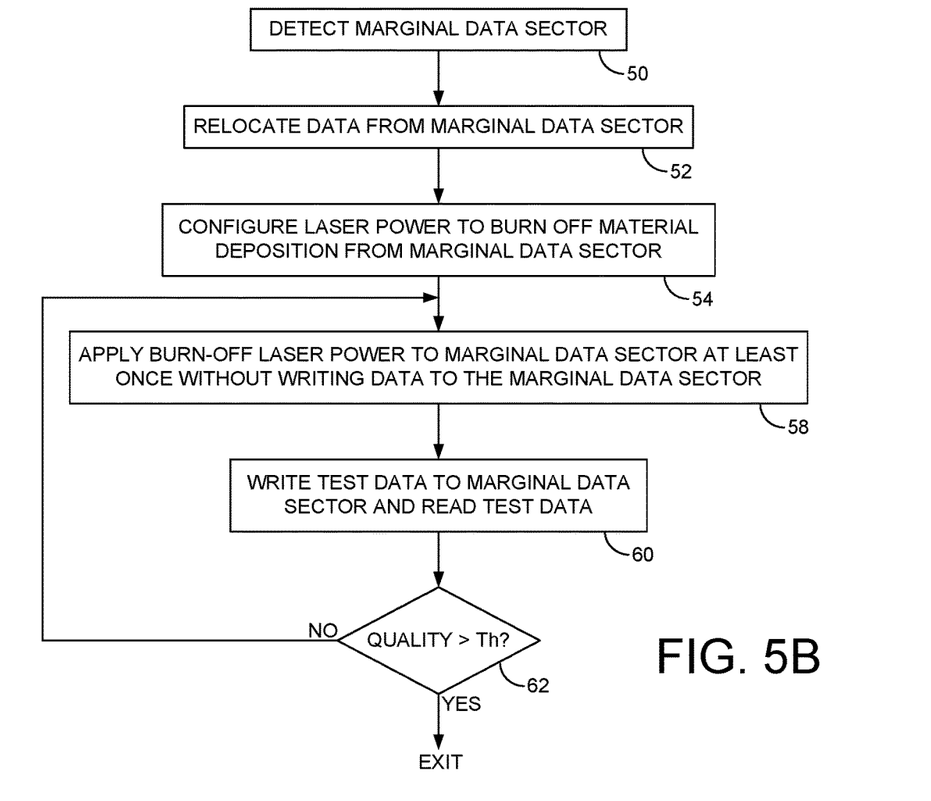
FIG. 5B is a flow diagram according to an embodiment wherein the burn-off laser power is applied to the laser until a quality of the marginal data sector rises above a threshold.

In one embodiment illustrated in the flow diagram of FIG. 5B, after applying the "burn-off power" at least once without writing data to the marginal data sector (block 58), the quality of the data sector may be tested such as by writing/reading test data to/from the data sector (block 60). If the data sector is still considered marginal (block 62), the "burn-off power" may again be applied to the data sector at least once without writing data to the data sector (block 58). This process may be repeated a number of times until the quality of the data sector exceeds a threshold at block 62. In one embodiment, the level of the "burn-off power" may be adjusted (e.g., increased) each time the data sector fails the quality test to increase the "burn-off" effect. If after multiple iterations of testing and burning the data sector still fails the quality test, in one embodiment the data sector may be deemed defective and mapped out of use.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk, wherein the head comprises a laser configured to heat the disk while writing data to the disk; and
   control circuitry configured to:
   configure a laser power applied to the laser with a write power in order to write data to the disk during a write operation;

determine the laser power should be in an off state after the write operation, wherein the laser power in the off state is less than ten percent of the write power; and after the write operation, gradually decrease the laser power to the off state based on a first decrease function, wherein the first decrease function comprises a step decrease to a non-write power followed by a decrease based on a second decrease function.

2. The data storage device as recited in claim 1, wherein the laser power in the off state is substantially zero.

3. The data storage device as recited in claim 1, wherein the first decrease function comprises at least one step decrease.

4. The data storage device as recited in claim 1, wherein the first decrease function comprises a ramp function.

5. The data storage device as recited in claim 1, wherein the first decrease function comprises an exponential decay.

6. The data storage device as recited in claim 1, wherein the second decrease function comprises at least one step decrease.

7. The data storage device as recited in claim 1, wherein the second decrease function comprises a ramp function.

8. The data storage device as recited in claim 1, wherein the second decrease function comprises an exponential decay.

9. The data storage device as recited in claim 1, wherein the disk comprises a plurality of tracks defined by servo sectors and after the write operation the control circuitry is further configured to:

decrease the laser power to a first percentage of the write power; and when the head reaches a first servo sector, decrease the laser power to a second percentage of the write power, wherein the second percentage is less than the first percentage.

10. The data storage device as recited in claim 9, wherein the second percentage causes material built up on the head to be deposited over the first servo sector.

11. The data storage device as recited in claim 9, wherein the control circuitry is further configured to:

after the head passes the first servo sector, increase the laser power to the first percentage of the write power; and when the head reaches a second servo sector following the first servo sector, decrease the laser power to the second percentage of the write power.

12. A data storage device comprising:

a disk comprising a plurality of tracks defined by servo sectors;

a head actuated over the disk, wherein the head comprises a laser configured to heat the disk while writing data to the disk; and control circuitry configured to:

configure a laser power applied to the laser with a write power in order to write data to the disk during a write operation;

after the write operation, decrease the laser power to a first percentage of the write power; and when the head reaches a first servo sector, decrease the laser power to a second percentage of the write power, wherein the second percentage is less than the first percentage.

13. The data storage device as recited in claim 12, wherein the second percentage causes material on the head to be deposited over the first servo sector.

14. The data storage device as recited in claim 12, wherein the control circuitry is further configured to:

after the head passes the first servo sector, increase the laser power to the first percentage of the write power; and when the head reaches a second servo sector following the first servo sector, decrease the laser power to the second percentage of the write power.

15. A data storage device comprising:

a disk comprising a plurality of data sectors;

a head actuated over the disk, wherein the head comprises a laser configured to heat the disk while writing data to the disk; and control circuitry configured to:

apply a write power to the laser when writing data to the data sectors;

detect a marginal data sector on the disk;

configure a burn-off power to burn off material buildup from the marginal data sector; and apply the burn-off power to the laser while the head is over the marginal data sector at least once.

16. The data storage device as recited in claim 15, wherein the burn-off power is the same as the write power.

17. The data storage device as recited in claim 15, wherein the control circuitry is further configured to apply the burn-off power to the laser without writing data to the marginal data sector.

18. The data storage device as recited in claim 15, wherein the control circuitry is further configured to apply the burn-off power to the laser when the head is over the marginal data sector over multiple disk revolutions.

19. The data storage device as recited in claim 18, wherein the control circuitry is further configured to apply the burn-off power to the laser when the head is over the marginal data sector until the control circuitry detects a quality of the data sector rises above a threshold.

20. A method of operating a data storage device, the method comprising:

configuring a laser power applied to a laser of a head with a write power in order to write data to a disk during a write operation;

determining the laser power should be in an off state after the write operation, wherein the laser power in the off state is less than ten percent of the write power; and after the write operation, gradually decreasing the laser power to the off state based on a first decrease function, wherein the first decrease function comprises a step decrease to a non-write power followed by a decrease based on a second decrease function.

21. The method as recited in claim 20, wherein the laser power in the off state is substantially zero.

22. The method as recited in claim 20, wherein the first decrease function comprises at least one step decrease.

23. The method as recited in claim 20, wherein the first decrease function comprises a ramp function.

24. The method as recited in claim 20, wherein the first decrease function comprises an exponential decay.

25. The method as recited in claim 20, wherein the second decrease function comprises at least one step decrease.

26. The method as recited in claim 20, wherein the second decrease function comprises a ramp function.

27. The method as recited in claim 20, wherein the second decrease function comprises an exponential decay.

28. The method as recited in claim 20, further comprising:

decreasing the laser power to a first percentage of the write power; and when the head reaches a first servo sector on the disk, decreasing the laser power to a second percentage of the write power, wherein the second percentage is less than the first percentage.

29. The method as recited in claim 28, wherein the second percentage causes material built up on the head to be deposited over the first servo sector.

30. The method as recited in claim 28, further comprising:
    after the head passes the first servo sector, increasing the laser power to the first percentage of the write power; and
    when the head reaches a second servo sector on the disk following the first servo sector, decreasing the laser power to the second percentage of the write power.

31. A method of operating a data storage device, the method comprising:
    configuring a laser power applied to a laser of a head with a write power in order to write data to a disk during a write operation;
    after the write operation, decreasing the laser power to a first percentage of the write power; and
    when the head reaches a first servo sector on the disk, decreasing the laser power to a second percentage of the write power, wherein the second percentage is less than the first percentage.

32. The method as recited in claim 31, wherein the second percentage causes material on the head to be deposited over the first servo sector.

33. The method as recited in claim 31, further comprising:
    after the head passes the first servo sector, increase the laser power to the first percentage of the write power; and
    when the head reaches a second servo sector on the disk following the first servo sector, decrease the laser power to the second percentage of the write power.

34. A method of operating a data storage device, the method comprising:
    applying a write power to a laser of a head when writing data to data sectors on a disk;
    detecting a marginal data sector on the disk;
    configuring a burn-off power to burn off material buildup from the marginal data sector; and
    applying the burn-off power to the laser while the head is over the marginal data sector at least once.

35. The method as recited in claim 34, wherein the burn-off power is the same as the write power.

36. The method as recited in claim 34, further comprising applying the burn-off power to the laser without writing data to the marginal data sector.

37. The method as recited in claim 34, further comprising applying the burn-off power to the laser when the head is over the marginal data sector over multiple disk revolutions.

38. The method as recited in claim 37, further comprising applying the burn-off power to the laser when the head is over the marginal data sector until a quality of the data sector rises above a threshold.

39. A data storage device comprising:
    a disk;
    a head actuated over the disk, wherein the head comprises a laser configured to heat the disk while writing data to the disk; and
    control circuitry configured to:
        configure a laser power applied to the laser with a write power in order to write data to the disk during a write operation;
        determine the laser power should be in an off state after the write operation, wherein the laser power in the off state is less than ten percent of the write power; and
        after the write operation, gradually decrease the laser power to the off state based on a first decrease function,
    wherein the first decrease function comprises an exponential decay.

* * * * *